United States Patent [19]

Roling

[11] Patent Number: 5,131,723
[45] Date of Patent: Jul. 21, 1992

[54] GUIDE FOR A HEWING MACHINE MOUNTED ON A CONVEYOR

[75] Inventor: Franz Roling, Nordkirchen, Fed. Rep. of Germany

[73] Assignee: Kloeckner-Becorit GmbH, Castrop-Rauxel, Fed. Rep. of Germany

[21] Appl. No.: 716,100

[22] Filed: Jun. 17, 1991

[30] Foreign Application Priority Data

Jun. 18, 1990 [DE] Fed. Rep. of Germany ........ 4019413

[51] Int. Cl.⁵ .......................................... E21C 29/090
[52] U.S. Cl. .......................................... 299/43; 59/85; 474/235
[58] Field of Search ................. 299/42, 43; 198/735.2, 198/735.6; 59/85; 474/232, 233, 235

[56] References Cited

U.S. PATENT DOCUMENTS

| 4,813,748 | 3/1989 | Waddington et al. | 299/43 |
| 4,819,989 | 4/1989 | Kleine | 299/43 |
| 4,993,779 | 2/1991 | Cocksedge | 299/43 |

FOREIGN PATENT DOCUMENTS

| 0059051 | 6/1985 | European Pat. Off. | |
| 2938408 | 7/1982 | Fed. Rep. of Germany. | |
| 1413209 | 11/1975 | United Kingdom | 299/43 |

OTHER PUBLICATIONS

Industrie Minerale-Mine; Mar. 1975; pp. 374-376.

*Primary Examiner*—Bagnell: David J.
*Attorney, Agent, or Firm*—Watson, Cole, Grindle & Watson

[57] ABSTRACT

A guide rail 4 is used for movably mounting a coal hewing machine on a chain scraper conveyor 3. The hewing machine has a guide shoe 26 guided by the guide rail 4 and a chain wheel. The conveyor 3 has a conveyor channel 2 and, on the filling side, a mounting plate 1 for the guide rail 4. The guide rail 4 defines a chain passage 19 for a chain 20. The guide rail 4 also defines, in its roof side, an engagement groove 17 for the chain wheel and, in its floor side, openings 18 for the discharge of material. The chain 20 comprises long horizontal members 22 and short vertical members 21. The guide rail 4 is of box-shaped configuration and substantially rectangular cross-section. All four sides of the guide rail 4 are engaged by the guide shoe 26. On the filling side, the guide rail 4 has an upper portion in the form of an overhead bar 13 which is screwed to the lower portion 12. The vertical members 21 of the chain 20 project into the engagement groove 17.

16 Claims, 4 Drawing Sheets

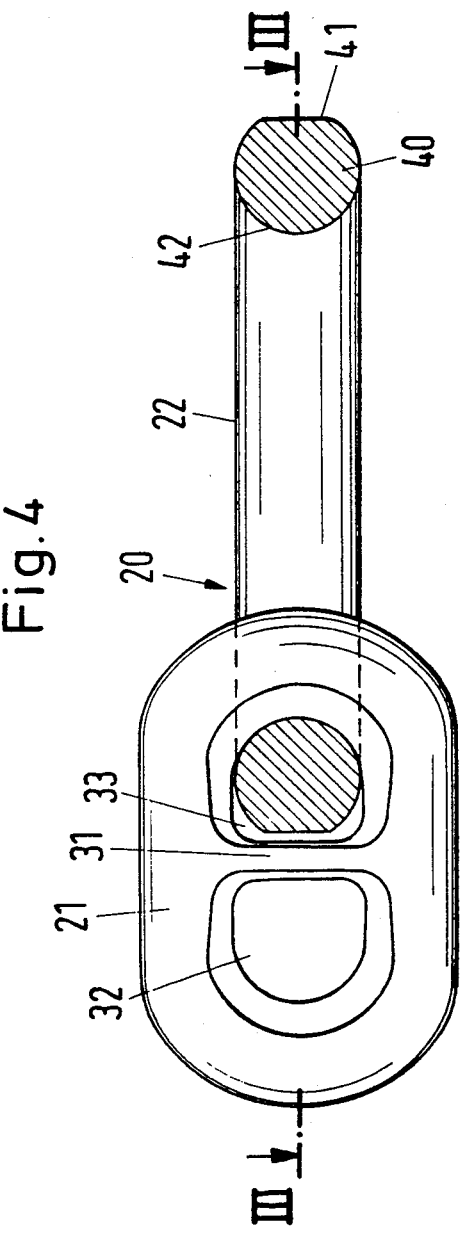
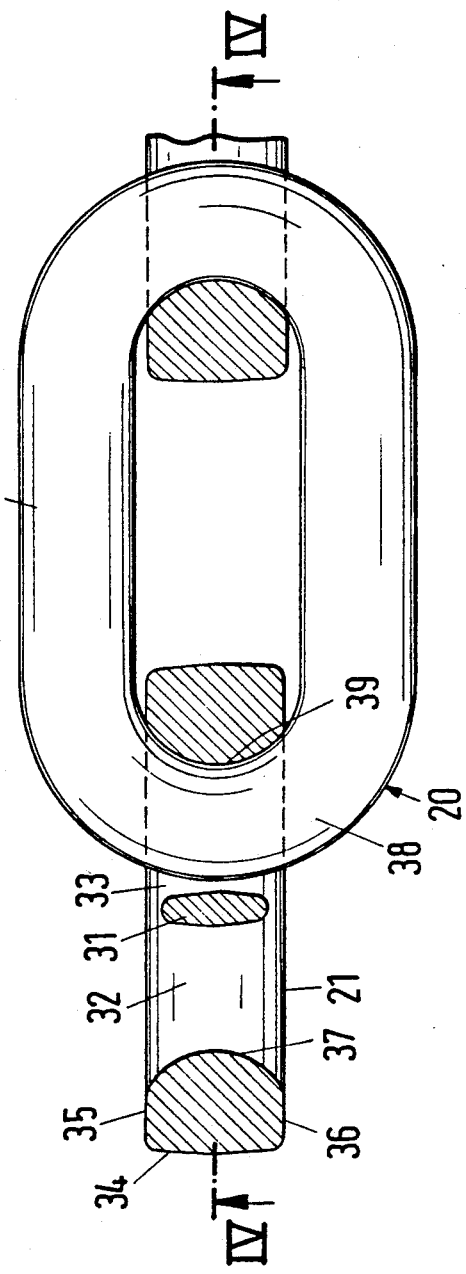

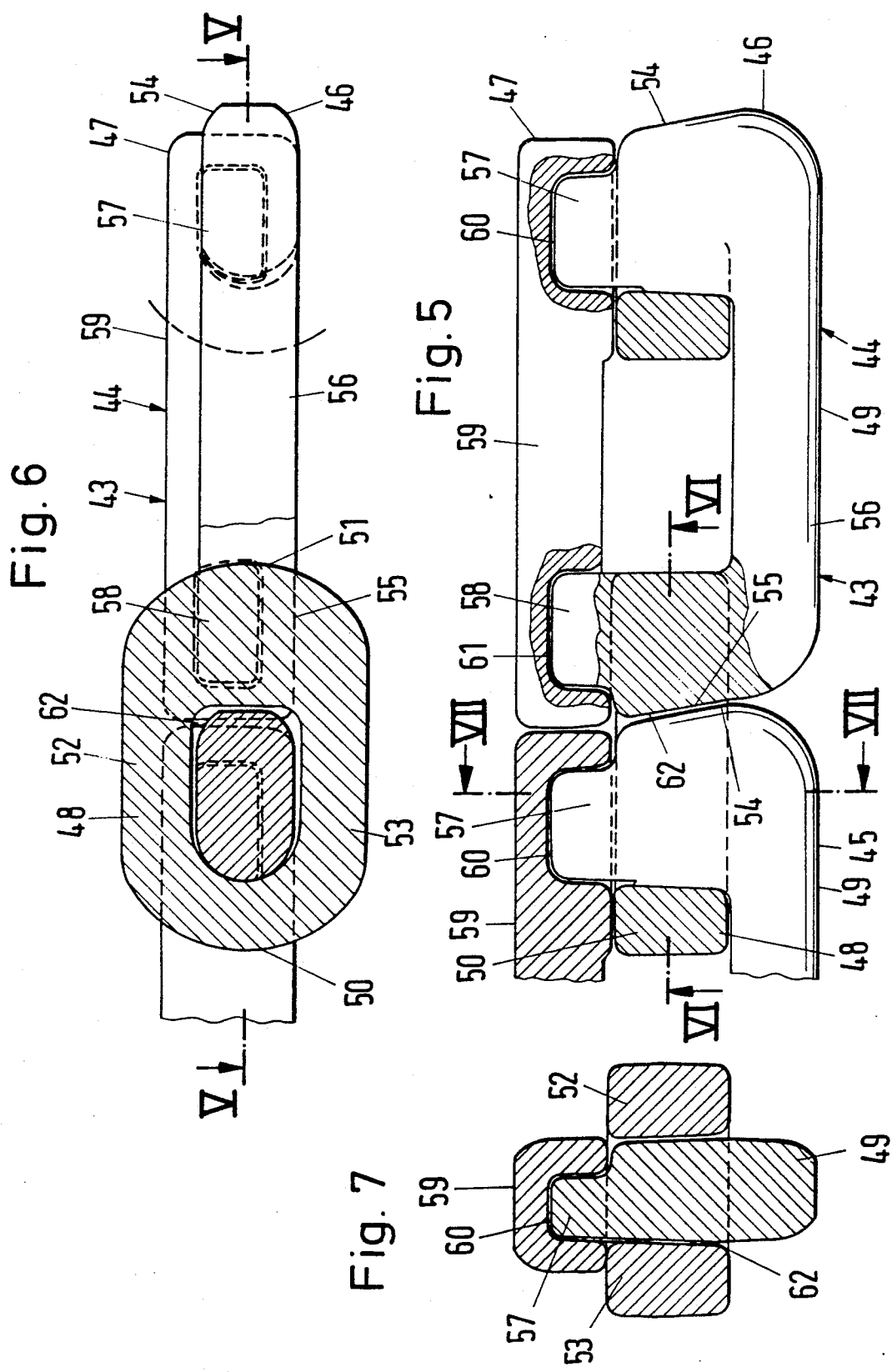

GUIDE FOR A HEWING MACHINE MOUNTED ON A CONVEYOR

FIELD OF THE INVENTION

This invention relates to an assembly comprising a hewing machine, or like extraction machine, a conveyor, such as a chain scraper conveyor, a guide rail for the hewing machine, and a chain disposed in a chain passage formed in the guide rail. The hewing machine is mounted movably on the conveyor by the guide rail and includes a guide shoe guided by the guide rail and a chain wheel.

BACKGROUND OF THE INVENTION

German patent specification No 29 38 408 discloses a guide rail for a hewing machine which has a running rail profile member comprising a holding bar portion at the filling side and a guide bar portion at the coal face side. The holding bar portion at the filling side is screwed fast to the mounting plate of the conveyor, on the filling side. Disposed at a spacing from the holding bar portion is the guide bar portion on the coal face side, while a chain passage for the chain is formed between the holding bar portion and the guide bar portion and an engagement groove for the chain wheel of the hewing machine is provided above the chain between the holding bar portion and the guide bar portion. Provided beneath the chain in the running rail profile member are discharge openings for the discharge of material to be conveyed, which is disposed in the chain passage. The guide bar portion is embraced by an L-shaped angular guide member on the hewing machine such that the contact surfaces of the guide bar portion for guiding the hewing machine is comparatively small. Consequently, the guide force bears on a comparatively small area of contact on the guide bar portion. This causes a correspondingly high rate of wear of the guide bar portion. When the guide bar portion is worn, the entire running rail profile member has to be replaced. On the other hand, the chain in the running rail profile member permits a uniform chain pitch, even in the case of angled channel runs, so that a comparatively large channel angle can be permitted without difficulties arising in reqard to movement of the hewing machine along the conveyor.

German laid open application (DE-OS) No 27 21 867 describes a drive shaft bar arrangement for a hewing machine. The drive shaft bar arrangement comprises longitudinal portions which correspond to half the length of a channel run. The junctions between adjacent channel runs are bridged over by longitudinal portions which are arranged at both ends in a respective bar holder with longitudinal play. Fixedly arranged between each two adjacent longitudinal portions with longitudinal play on the conveyor channel is another longitudinal portion. The longitudinal play of the longitudinal portions which bridge over the junctions in the conveyor channel is required in order to permit the individual channel runs to be in an angled position relative to each other. This arrangement provides comparatively large contact surface areas for a guide shoe on the hewing machine, thereby giving a good guiding effect for the hewing machine and a comparatively low rate of wear in respect of the drive shaft bar arrangement. On the other hand, however, an angled arrangement of the channel also involves a change in the pitch of the drive shaft teeth. This means that only a limited angled configuration of the channel can be permitted so that the hewing machine can move along the drive shaft bar without involving problems.

The known guide rails therefore give only the advantage of a uniform chain pitch, in which case it is necessary to accept the disadvantage of a high rate of wear and the resulting correspondingly short service times, or, only the advantage of a low rate of wear and the long service times involved, while not being able to prevent disadvantageous changes in pitch of the drive shaft tooth arrangement.

SUMMARY OF THE INVENTION

It is an object of this invention to provide a guide rail which ensures a uniform chain pitch and at the same time a low rate of wear in conjunction with a correspondingly long service life.

According to this invention, there is provided an assembly comprising a hewing machine, a conveyor, a guide rail for the hewing machine, and a chain disposed in a chain passage formed in the guide rail. The hewing machine is mounted movably on the conveyor by the guide rail and includes a guide shoe guided by the guide rail and a chain wheeel. The conveyor includes a conveyor channel and, on the filling side, a mounting plate on which the guide rail is mounted. The guide rail defines an engagement groove in its roof side for the chain wheel of the hewing machine and openings in its floor side for discharge of material to be conveyed which is disposed in the chain passage. The chain disposed in the chain passage comprises long horizontal members and short vertical members, in which the guide rail is of a box-shaped configuration and is of substantially rectangular cross-section. All four sides of the guide rail are engaged by the guide shoe of the hewing machine and serve as guide surfaces for the guide shoe of the hewing machine. On the filling side the guide rail has a lower portion and an upper portion in the form of an overhead bar which is screwed to the lower portion, and the vertical members of the chain disposed in the chain passage project into the engagement groove.

This assembly provides a guide rail and chain which have a uniform chain pitch and which at the same time are subject to a low rate of wear and thus afford long service lives. The guide rail and chain therefore do not have the short service life of known guide rails and chains with uniform chain pitch. In addition, a change in the pitch of the chain no longer has to be accepted, in order to achieve a long service life.

As in accordance with the invention all four surfaces of the guide rail are engaged by the guide shoe of the hewing machine, and serve as guide surfaces for the shoe guide of the hewing maching. A comparatively large area of contact is made available for guiding the hewing machine which gives rise to a correspondingly low rate of wear. Even in the case of angled channels, the arrangement ensures a uniform chain pitch so that comparatively large channel angular configurations can be admitted without the fear of disturbances in operation of the assembly.

Preferably, the width of the engagement groove, except for the necessary clearance for movement, corresponds to the width of the vertical members of the chain. Consequently, the chain is non-rotatably mounted in the chain passage.

Desirably the chain wheel of the hewing machine is engaged in the engagement groove between each two adjacent vertical members.

Fixing brackets may be provided on the guide rail on the filling side and on the floor side, for fixing the guide rail to the filling-side mounting plate of the conveyor.

Advantageously, each vertical member of the chain is in the form of a forged component with a central limb. The vertical members are connected together by the long horizontal members.

The cross-section of the vertical members may be such that the outside surface and the two side surfaces are flat, the side surfaces extending perpendicularly to the outside surface, and the inside surface may be curved corresponding to the curvature of the bend of the horizontal member at the inside thereof. This ensures that the vertical members are in contact both with the horizontal members and also with the teeth of the chain wheel, over a large area.

The cross-section of the horizontal member may be flattened on the outside and round in other respects.

Desirably, the chain comprises chain segments which are the same as each other, each chain segment having two different shaped portions, one shaped portion being a vertical chain member with an integrated horizontal C-shaped loop and the other shaped portion being a holding bar.

In this arrangement, the vertical chain member may be of substantially rectangular cross-section and may have an opening for receiving the next following shaped portion. The inner bend of the vertical chain member may be likewise the inner bend of the C-shaped loop and a longitudinal limb may be disposed between the inner bend and the outer bend of the C-shaped loop.

Formed at the open side of the C-shaped loop at the two bends thereof, there may be projections which are of smaller cross-section than the cross-section of the bends of the C-shaped loop. In this arrangement, the holding bar may have at both ends at the spacing of the projections of the C-shaped loop pockets which engage the projections of the C-shaped loop. The open side of the C-shaped loop may be closed by the holding bar.

The holding bar may be secured in the guide rail separately or by the form of the chain passage. It is sufficient for the holding bar simply to be fitted onto the projections of the C-shaped loop and introduced into the chain passage. This ensures that the holding bar does not drop off the C-shaped loop.

The chain may comprise any number of chain segments, while the respective outer bends of the C-shaped loops may engage into the openings of the vertical chain members and holding bars may be fitted onto the projections of the C-shaped loops.

The almost rectangular cross-section of the vertical members results in a relatively large area of contact between the chain member and the tooth of the chain wheel which engages thereinto, and this has an advantageous effect in terms of wear.

Another advantage is that individual chain members can be replaced, for example, in the event of wear. It is further possible for the length of the chain to be altered.

BRIEF DESCRIPTION OF THE DRAWINGS

This invention will now be described in more detail, by way of example, with reference to the drawings, in which:

FIG. 3 shows a first embodiment of a chain in longitudinal section taken along the line III—III in FIG. 4;

FIG. 4 shows the chain of FIG. 3 in longitudinal section taken along the line IV—IV in FIG. 3;

FIG. 5 shows a second embodiment of a chain in longitudinal section taken along the line V—V in FIG. 6;

FIG. 6 shows the chain of FIG. 5 in longitudinal section along the line VI—VI in FIG. 5;

FIG. 7 is a view in cross-section through the chain of FIG. 5 taken along the line VII—VII in FIG. 5;

DETAILED DESCRIPTION OF PREFERRED EMBODIMENTS

Figure 1:
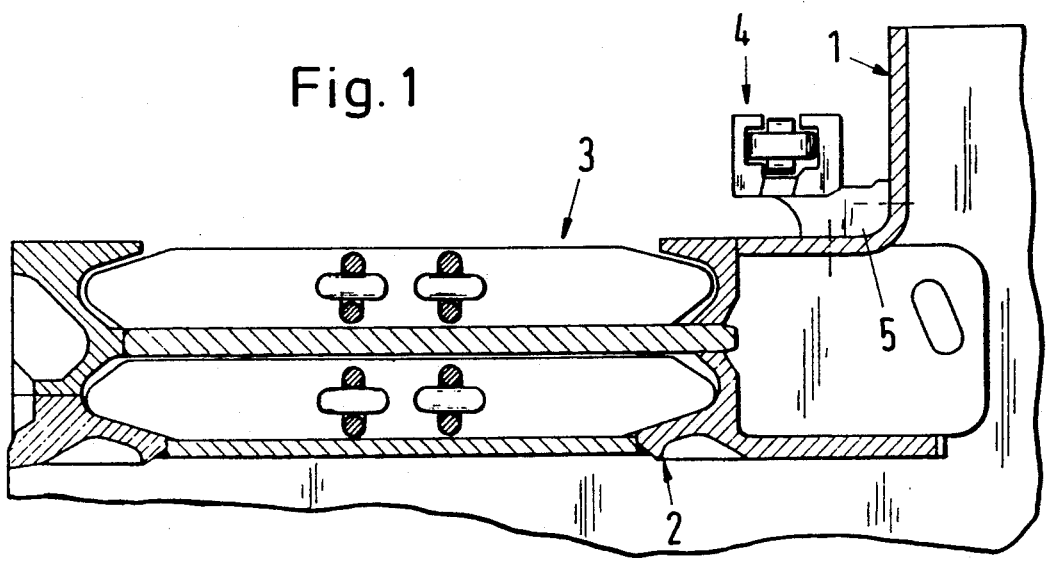
FIG. 1 is a view in cross-section through a conveyor channel and an associated guide rail.
Figure 2:
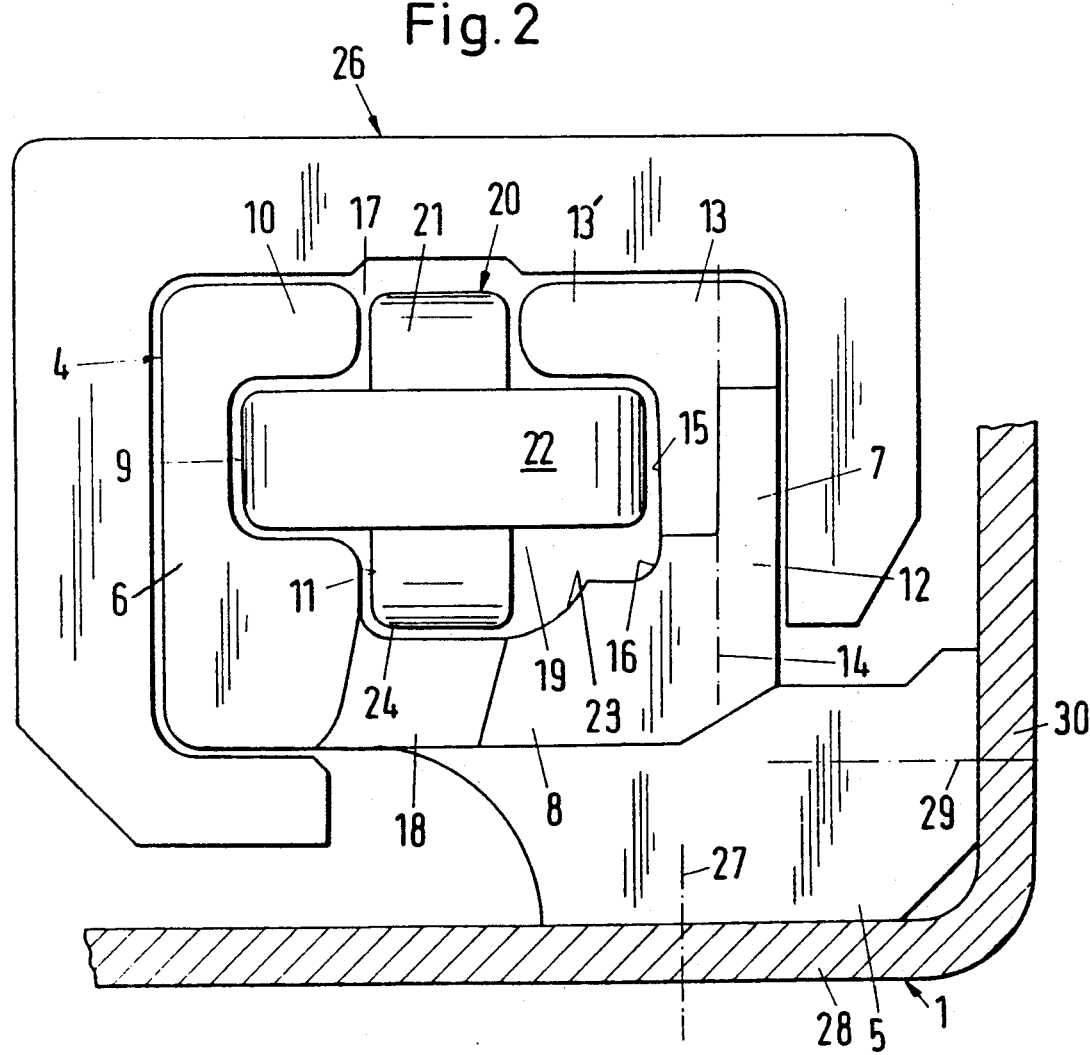
FIG. 2 is an end view of the guide rail shown in FIG. 1 together with a chain disposed therein.

Referring now to FIGS. 1 and 2, there is shown the conveyor channel 2 of a chain scraper conveyor 3. On the filling side, the conveyor channel has a mounting plate 1. A guide rail 4 is secured to the mounting plate 1 by means of fixing brackets 5. A coal hewing machine (not shown in detail) has a guide shoe 26 and the hewing machine is movably mounted on the guide rail 4 by the guide shoe 26. The hewing machine has a drive or chain wheel (not shown).

As shown in particular in FIG. 2, the guide rail 4 is of a box-shaped configuration and is of substantially rectangular cross-section. The guide rail 4 has a side wall 6 at the coal face side and a side wall 7 at the filling side, which are connected together by a bottom 8. The side wall 6 at the coal face side has a side groove 9, at approximately its mid-height position, while at its upper end it has an inwardly directed flange 10. At its lower end, the side wall 6 on the ooal face side merges into the bottom 8 in which a bottom groove 11 is formed.

On the filling side, the bottom 8 is adjoined by the side wall 7 of the filling side. The side wall 7 comprises a lower wall portion 12 and an overhead or over-engaement bar 13, the lower wall portion 12 and the bar 13 are connected together releasably by a plurality of screws 14. Arranged in the overhead bar 13 is a side groove 15 which is aligned with a side groove 16 in the lower wall 12. The bar 13 has an inwardly projecting flange 13' Which is disposed opposite the flange 10 at the same level. Formed between the flanges 10 and 13' is an engagement groove 17 for the chain wheel of the hewing machine. A plurality of openings 18 are provided in the bottom 8 beneath the bottom groove 11.

The guide rail 4 defines a chain passage 19 within the guide rail. Arranged in the chain passage 19 is a chain 20 comprising short vertical members 21 and long horizontal members 22. The vertical members 21 are prevented from twisting laterally in the engagement groove 17 and the bottom groove 11. In this respect, the width of the engagement groove 17, except for the necessary clearance for movement, corresponds to the width of the vertical member 21 which is also mounted with suitable clearance in the bottom groove 11.

The horizontal member 22 is also mounted with the necessary clearance for movement in the side grooves 9 and 16. At bottom right, the chain passage 19 has an inclinedly extending recess 23 therein.

In order to remove the chain 20 from the chain passage 19, the screws 14 may be loosened so that the bar 13 can be lifted off the side wall 7 on the filling side. The chain 20 is then turned towards the left in the view shown in FIG. 2. The vertical member 21 is then moved with its lower limb portion 24 past the inclined recess 23. The chain 20 is fitted into the chain passage 19 in a correspondingly reversed manner.

The guide shoe 26 of the hewing machine embraces the guide rail 4 at all four sides over a large area so as to ensure a good guidance effect with a low level of friction and thus a long service life.

The fixing bracket 5 is fixed by means of a screw 27 to the horizontal flange 28 and by means of a screw 29 to the vertical flange 30 of the mounting plate 1.

FIGS. 3 and 4 show a first embodiment of a chain 20 which is suitable for use in the guide rail 4. The vertical member 21 is in the form of a forged component with a central limb 31, wherein openings 32 and 33 are provided on both sides of the central limb 31. Respectively adjacent horizontal members 22 are engaged in the openings 32 and 33. The cross-section of the vertical members 21 is such that the outside surface 34 is substantially flat. Likewise the two side surfaces 35 and 36 which extend perpendicularly to the outside surface 34 are of a flat configuration. The inside surface 37 is curved to correspond to the curvature of the bend 38 of the horizontal member 22 at the inside 39 thereof. The cross-section 40 of the horizontal member 22 is flat at its outside surface 41 and is of a circularly curved configuration in the remaining region 42.

FIGS. 5 to 7 show a second embodiment of a chain 43 which can be used in the guide rail 4. It comprises chain segments 44 and 45 which are the same as each other. Each chain segment comprises two different shaped portions 46 and 47. The first shaped portion 46 is formed from a vertical chain member 48 with an integrated horizontal C-shaped loop 49. The vertical chain member 48 has an outside bend 50 and an inside bend 51 which are spaced from each other by way of two longitudinal limbs 52 and 53. Likewise, the C-shaped loop 49 has an outside bend 54 and an inside bend 55 which are connected together by a longitudinal limb 56. The inside bend 51 of the vertical chain member 48 is also the inside bend 55 of the C-shaped loop 49.

Formed at the free ends of the bends 54 and 55 are projections 57 and 58 which are of smaller cross-section than the cross-section of the bends 54 and 55.

The second shaped portion 47 is a holding bar 59 which has two pockets 60 and 61 into which the projections 57 and 58 of the C-shaped loop 49 engage. In this way, the open side of the C-shaped loop 49 is closed by the holding bar 59. The holding bar 59 can be secured to the projections 57 and 58 to prevent it from falling off. The shape of the chain passage 19 however also provides for securing the holding bar 59 to prevent it from falling off the projections 57 and 58.

The chain 43 comprises any number of chain segments 44, 45, in which the respective outside bends 54 of the C-shaped loops 49 engage into the openings 62 of the vertical chain members 48 and holding bars 59 are fitted on to the projections 57 and 58 of the C-shaped loops 49.

Figure 8:
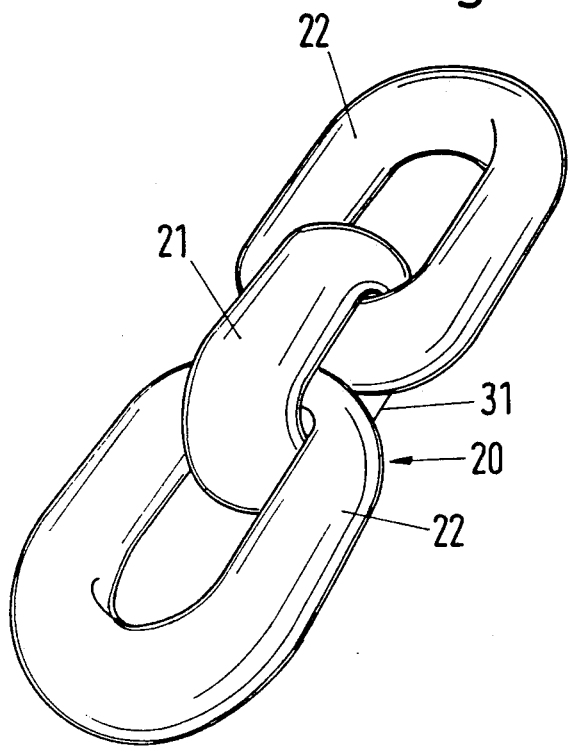
FIG. 8 is a perspective view of the chain shown in FIG. 3 and 4.

FIG. 8 shows three chain members of the chain 20, namely a short vertical member 21 with transverse limb 31 and two long horizontal members 22.

Figure 9:
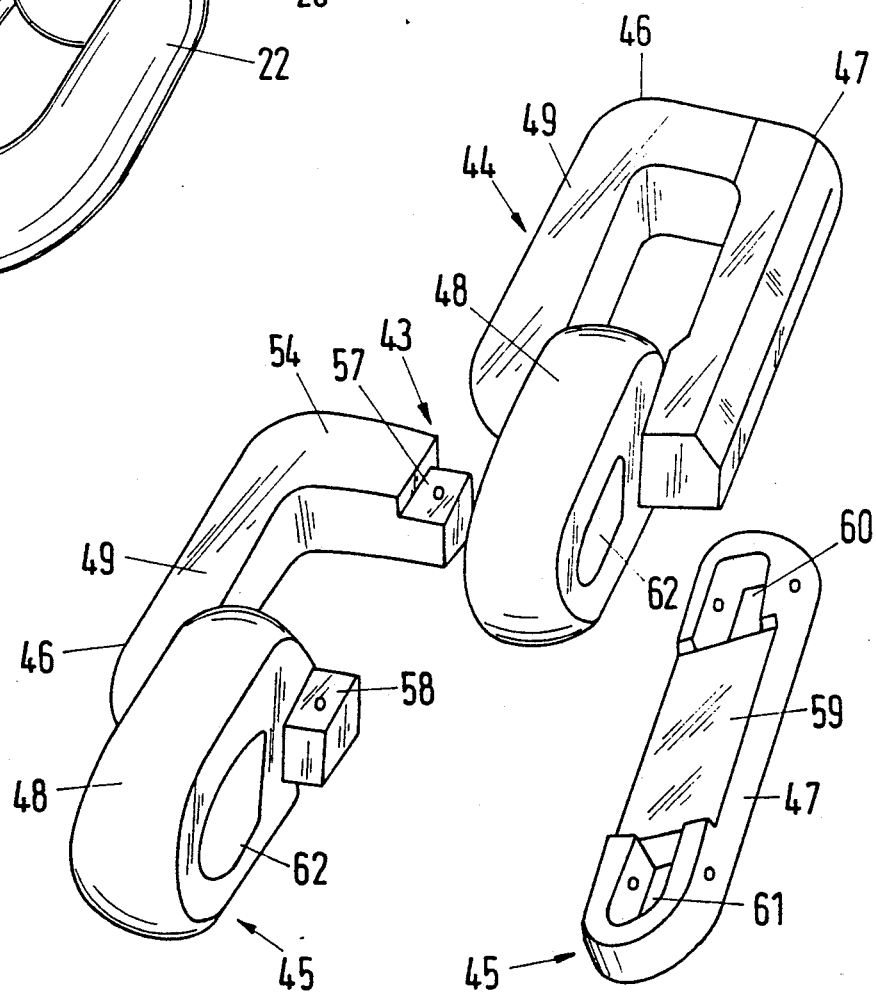
FIG. 9 is a perspective view of the chain shown in FIGS. 5 to 7.

FIG. 9 shows two chain segments 44, 45 of the chain 43. The upper chain segment 44 is shown in FIG. 9 in the assembled condition while the lower chain segment 45 is shown in the non-assembled condition. The shaped portion shown at the left in FIG. 9 illustrates the vertical chain member 48 and the C-shaped loop 49, which is integrated therewith with projections 57 and 58. Shown at the right is the other shaped portion 47 which is in the form of a holding bar 49 and has pockets 60 and 61 for the projections 57 and 58. In the assembled condition, the bend 54 is engaged through the opening 62, and the projections 57 and 58 are engaged into the pockets 60 and 61 in the holding bar 59 and are secured in position there by pins.

I claim:

1. An assembly comprising a hewing machine, a conveyor, a guide rail for the hewing machine, and a chain disposed in a chain passage formed in the guide rail, said hewing machine being mounted movably on the conveyor by the guide rail and including a guide shoe guided by the guide rail and a chain wheel, said conveyor including a conveyor channel and, on the filling side, a mounting plate on which the guide rail is mounted, said guide rail defining an engagement groove in its roof side for the chain wheel of the hewing machine, said guide rail defining openings in its floor side for discharge of material to be conveyed which is disposed in the chain passage, and said chain comprising long horizontal members and short vertical members, wherein the guide rail is of a box-shaped configuration and is of substantially rectangular cross-section, all four sides of the guide rail are engaged by the guide shoe of the hewing machine and serve as guide surfaces for the guide shoe of the hewing machine, on the filling side the guide rail has a lower portion and an upper portion in the form of an overhead bar which is screwed to the lower portion, and the vertical members of the chain disposed in the chain passage project into the engagement groove.

2. An assembly as claimed in claim 1, in which the width of the engagement groove, except for the necessary clearance for movement, corresponds to the width of the vertical members of the chain.

3. An assembly as claimed in claim 1, in which the chain wheel of the hewing machine is engaged in the engagement groove between each two adjacent vertical members.

4. An assembly as claimed in claim 1, including fixing brackets provided on the guide rail on the filling side and on the floor side with which the guide rail is fixed to said filling side mounting plate of the conveyor.

5. An assembly as claimed in claim 1, in which each vertical member of the chain is in the form of a forged component having a central limb, the vertical members being connected together by the long horizontal members.

6. An assembly as claimed in claim 1, in which the cross-section of each vertical member is such that the outside surface and the two side surfaces are flat, the side surfaces extend perpendicularly to the outside surface, and the inside surface is curved to correspond to the curvature of the bend of a horizontal member at the inside thereof.

7. An assembly as claimed in claim 1, in which the cross-section of each horizontal member is flattened on the outside and in other respect is round.

8. An assembly as claimed in claim 1, in which the chain comprises chain segments which are the same as each other, each chain segment having two different shaped portions, the one shaped portion being a vertical chain member with an integrated horizontal C-shaped loop and the other shaped portion being a holding bar.

9. An assembly as claimed in claim 8, in which the vertical chain member is of substantially rectangular cross-section and has an opening for receiving the next following shaped portion.

10. An assembly as claimed in claim 9, in which the inner bend of the vertical chain member is also the inner bend of the C-shaped loop and a longitudinal limb is arranged between the inner bend and the ouer bend of the C-shaped loop.

11. An assembly as claimed in calim 8, in which the inner bend of the vertical chain member is also the inner bend of the C-shaped loop and a longitudinal limb is arranged between the inner bend and the outer bend of the C-shaped loop.

12. An assembly as claimed in claim 8, in which projections are formed at the open side of the C-shaped loop at the two bends thereof which are smaller in cross-section than the cross-section of the bends of the C-shaped loop.

13. An assembly as claimed in claim 12, in which the holding bar has at both ends at the spacing of the projections of the C-shaped loop, pockets which engage the projections of the C-shaped loop.

14. An assembly as claimed in claim 12, in which the chain comprises any number of chain segments, the respective outer bends of the C-shaped loops engage into the openings of the vertical chain members, and holding bars are fitted onto the projections of the C-shaped loops.

15. An assembly as claimed in claim 8, in which the open side of the C-shaped loop is closed by the holding bar.

16. An assembly as claimed in claim 8, in which the holding bar is secured in the guide rail separately or by the shape of the chain passage.

* * * * *